(No Model.) 2 Sheets—Sheet 1.

O. KAIL.
BRICK KILN.

No. 440,041. Patented Nov. 4, 1890.

WITNESSES:
F. L. Durand
Van Buren Hillyard

INVENTOR
Oscar Kail.
BY
R. S. & A. P. Lacey
his ATTORNEYS

THE NORRIS PETERS CO., PHOTO-LITHO., WASHINGTON, D. C.

(No Model.) 2 Sheets—Sheet 2.
O. KAIL.
BRICK KILN.
No. 440,041. Patented Nov. 4, 1890.
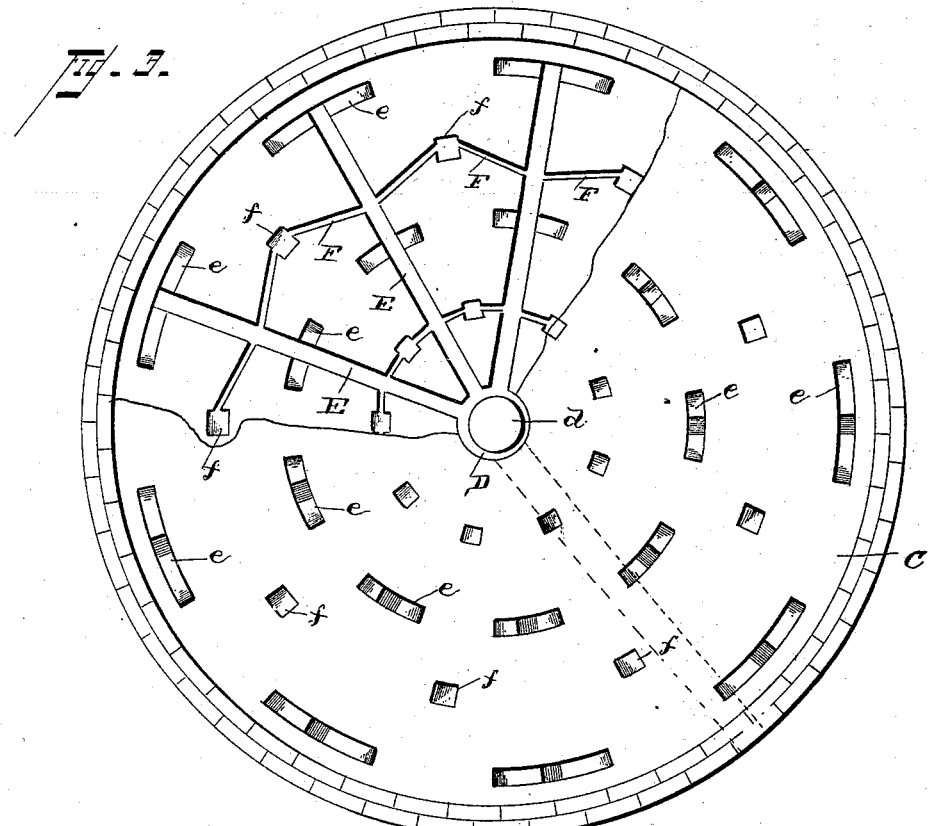
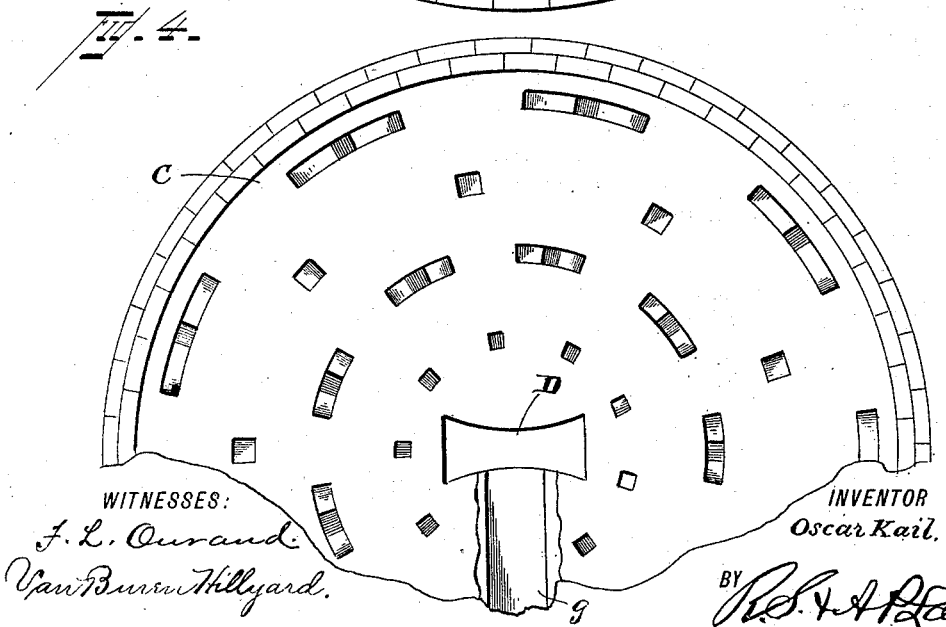
WITNESSES:
J. L. Ourand
Van Buren Hillyard
INVENTOR
Oscar Kail.
BY R. S. & A. P. Lacey
his ATTORNEYS

UNITED STATES PATENT OFFICE.

OSCAR KAIL, OF UHRICHSVILLE, OHIO.

BRICK-KILN.

SPECIFICATION forming part of Letters Patent No. 440,041, dated November 4, 1890.

Application filed June 6, 1890. Serial No. 354,432. (No model.)

*To all whom it may concern:*

Be it known that I, OSCAR KAIL, a citizen of the United States, residing at Uhrichsville, in the county of Tuscarawas and State of Ohio, have invented certain new and useful Improvements in Brick-Kilns; and I do hereby declare the following to be a full, clear, and exact description of the invention, such as will enable others skilled in the art to which it appertains to make and use the same.

This invention relates to kilns which are especially designed for burning brick, although it is equally well adapted for burning tile, sewer-pipe, terra-cotta, &c.

The object of the invention is to secure an equal distribution of the heat throughout the kiln, thereby evenly burning the ware or articles placed in the furnace.

A further object of the invention is to economize fuel and utilize the heat to the best possible advantage.

A still further object of the invention is to obtain a uniform draft at all points of the kiln, so that the draft at the exit-flue will be the same as that at more remote parts of the kiln, whereby all the articles in the kiln will be practically burned alike.

The improvement consists, first, of independent flues in the bench of the furnace, extending radially from a common flue which is centrally disposed, said flues having communication through suitable openings with the interior of the kiln; second, in a central opening with which the radial flues communicate, being contracted directly opposite its connection with the exit-flue; third, in flaring openings leading from the radial passages through the top of the bench of the kiln, whereby the air is drawn into the said passages in a manner not attained by any other form of opening; fourth, in an elevated floor, leaving an air-space between it and the bench of the kiln, whereby a free circulation of air and heat is obtained, and, fifth, in tiles spanning the central opening and converging at their inner ends to form narrow flues or passages for the escape of the confined heat.

The improvement further consists of the novel features which will be hereinafter more fully described and claimed, and which are shown in the annexed drawings, in which—

Figure 1:
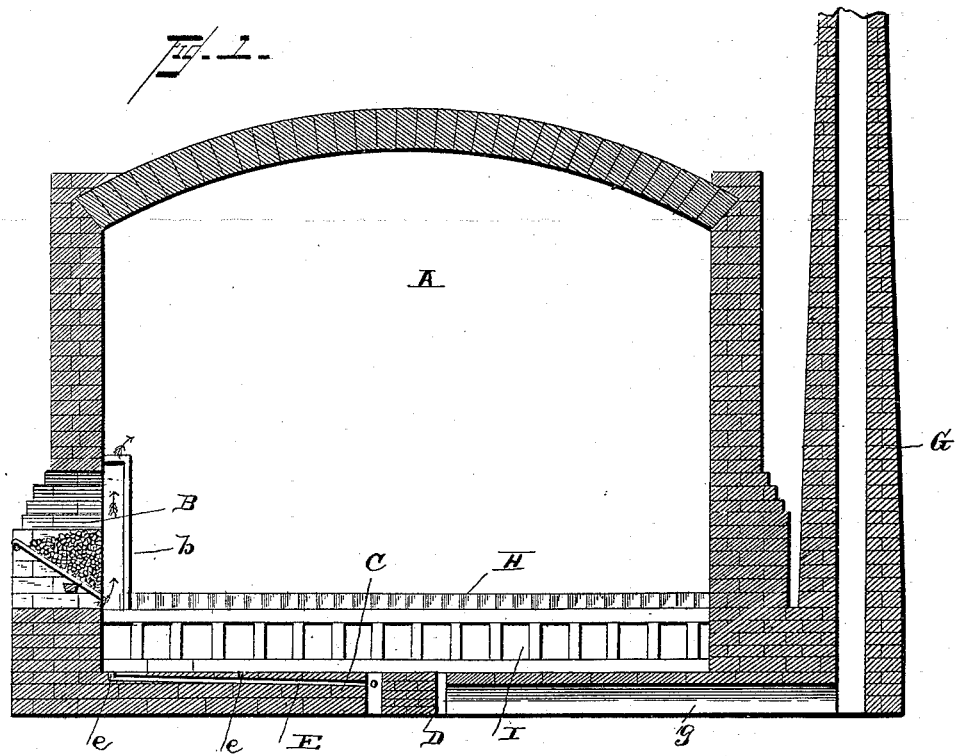
Figure 2:
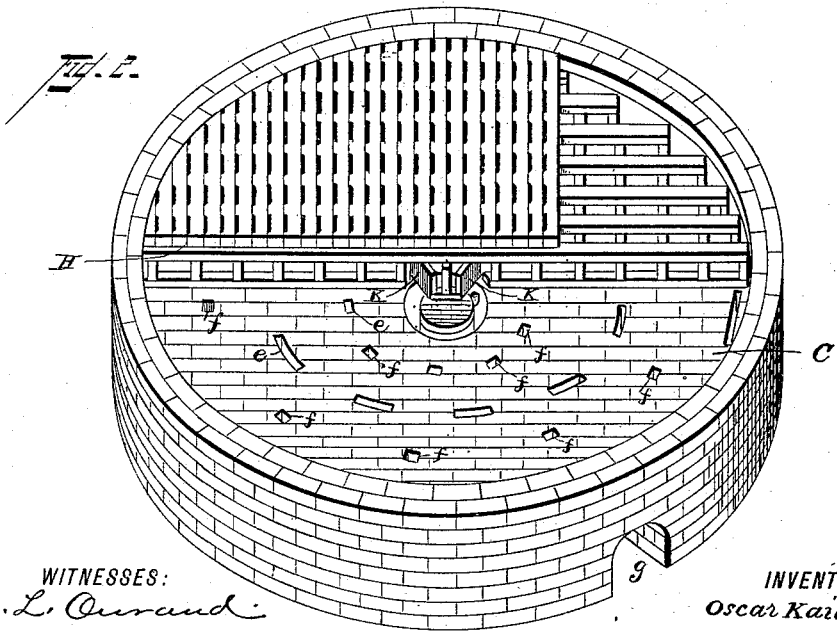

Figure 1 is a vertical central sectional view of a kiln embodying my invention. Fig. 2 is a perspective view, parts being broken away, of the base or lower portion of the kiln. Fig. 3 is a plan view, parts being broken away, of the bench of the kiln. Fig. 4 is a detail view showing a modified form of opening or flue in the center of the bench of the kiln.

The kiln A is circular in form and operates with a downdraft, the crown being closed. The furnaces or firing-chambers B are of usual construction and are disposed at suitable intervals around the kiln, being provided on the interior of the kiln with the usual bag-wall $b$, which extends up a sufficient distance to give proper direction to the heat. The bench C of the kiln is provided with a central opening D, from which radial flues E extend to within a short distance of the wall of the kiln. These flues E are provided in sufficient numbers to cover the bench of the kiln, and incline upwardly from their inner ends to regulate the draft, in that the heat will have a less distance to travel to reach the outer end of the flue than at the inner end thereof. The openings $e$ extend from the flues through the top of the bench C of the kiln and form passages for the heat from the kiln to the said flues. These openings $e$ are narrow and long and flare upwardly in the direction of their length, being formed at right angles to the flues E. To distribute the heat more evenly, branch flues F are provided in the bench of the kiln, which communicate with the interior of the kiln through openings $f$ in the bench C of the kiln, said openings $f$ being arranged intermediate the flues E and the openings $e$.

The stack G, placed to one side of the kiln, communicates with the openings D by flue $g$, which extends through the bench C of the kiln. The opening D may be oblong, as shown in Fig. 4, or it may be circular in form, as shown in the other figures. In either case this opening is contracted at a point opposite its communication with the flue $g$, thereby causing the draft to be uniform at all points of the said opening. The preferred form of opening D is annular, which is obtained by constructing a core $d$ of masonry in the center of the opening, thereby forming a circular passage around the said core. This passage is eccentric, being widest at the point farthest removed from the end of the flue $g$ and narrowest at a point directly opposite the end of the said flue $g$.

The floor H is elevated above the bench of the kiln, leaving an air-space I between it and the said bench, and is perforated to permit a free circulation of the heat at all points. The tiles K span the opening or annular passage D and form a support for the center of the floor H. These tiles converge at their inner ends to form narrow passages between them to prevent a stronger draft at the center of the kiln than at any other point.

The operation of the kiln is as follows: After being filled with the articles to be burned the opening through which said articles are passed is bricked up and the fires are started in the furnaces B. The heat rising to the crown of the kiln is deflected and drawn down in all directions alike, passing through the perforated floor H into the space I, and from thence through openings $e\ e\ f\ f$ and passages F and E to the central opening D and through flues $g$ to the stack G. It will be observed that the suction through the openings $f$ and $e$ is evenly distributed over the bench of the kiln, thereby causing the heated air to pass through the perforated floor H uniformly at all points thereof, thereby burning the ware uniformly and evenly in all parts of the kiln.

Having thus described my invention, what I claim, and desire to secure by Letters Patent, is—

1. A kiln having a central opening in its bench, and having radial flues extending from the said opening and communicating with the interior of the kiln through suitable openings, and having the stack in communication with said openings through a flue in the bench of the kiln, said central openings being contracted at a point directly opposite their communication with the stack-flue, substantially as described, for the purpose specified.

2. A kiln having a central opening in its bench and radial flues extending from the said opening and communicating with the interior of the kiln, and having the stack in communication with the said opening and with the flue, and having a core in the center of the said opening, whereby the said opening is converted into an annular passage or flue which is eccentric in form, having the narrowest portion directly opposite the end of the stack-flue, substantially as described.

In testimony whereof I affix my signature in presence of two witnesses.

OSCAR KAIL.

Witnesses:
W. H. LYDICK,
M. C. HILLYARD.